UNITED STATES PATENT OFFICE.

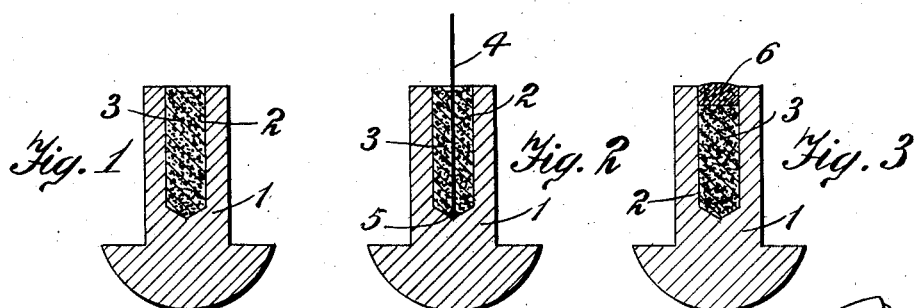
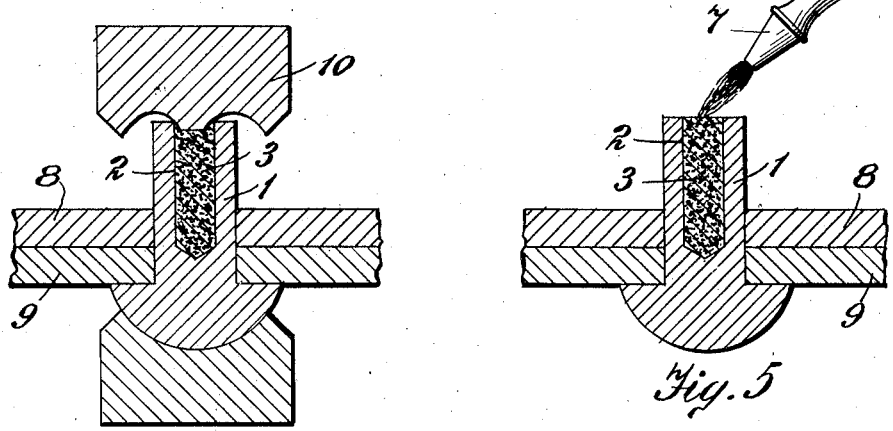
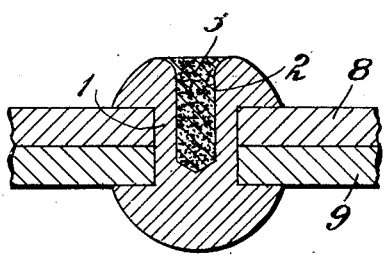
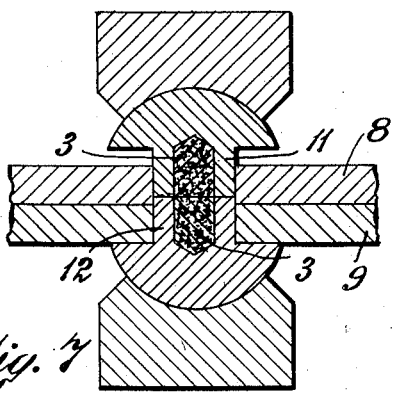

JAMES H. GRAVELL, OF ELKINS PARK, PENNSYLVANIA, ASSIGNOR TO THOMSON ELECTRIC WELDING COMPANY, OF BOSTON, MASSACHUSETTS, A CORPORATION OF MASSACHUSETTS.

SELF-HEATING RIVET AND METHOD OF RIVETING WITH SAME.

1,382,906.          Specification of Letters Patent.    Patented June 28, 1921.

Application filed May 11, 1920. Serial No. 380,581.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Self-Heating Rivets and Methods of Riveting with Same, of which the following is a specification.

My present invention relates to a novel form of rivet and to the process of joining metal plates or pieces together by means of such rivet.

The object of the invention is to provide a self-heating rivet—that is, a rivet which has embodied as part of it, the means for heating it to render it plastic so that it can be utilized to join plates or pieces of metal together. The advantages of such a rivet and of joining parts together by such a rivet are many and obvious. Among the advantages are that no heating furnaces or apparatus with accompanying labor are required to heat the rivet; there is no passing of hot rivets; the rivets may be inserted cold in the holes in the work and therefore a tight and exact fit assured; an operator may carry any number of the rivets on his person and use them as and where required.

Generally stated, the invention consists of a rivet blank of any desired shape provided with a cavity or pocket which holds a heating composition. When it is desired to heat the rivet, the heating composition is ignited in any of a number of different ways and after or during the heating reaction the rivet is upset or headed in the regular way by a hammer or other pressure device. Also, if desired the heating of the rivet may be carried on to a point where the sides of the rivet, by the application of the upsetting pressure, are welded to the plates or parts around the rivet holes.

The accompanying drawings show various ways of carrying out the invention and which are more or less diagrammatic and purely for the purposes of illustration only. Figures 1, 2 and 3 are longitudinal cross-sections through rivet blanks showing various forms of carrying out the invention.

Figs. 4 and 5 are cross-sections through plates having the rivets applied thereto and illustrate in Fig. 4 a manner of applying the heading pressure and in Fig. 5 one manner of igniting the heating composition contained in the rivet.

Fig. 6 is a cross-section through the headed rivet.

Fig. 7 illustrates a slight modification in the manner of applying the rivet to the work.

In Fig. 1 a rivet embodying this invention in its simplest form is shown. 1 indicates the rivet blank and 2 indicates a pocket or cavity entering longitudinally into the shank of the rivet for any suitable distance according to the amount of heating composition necessary for the particular kind or size rivet. 3 indicates the heating composition held in the cavity 2 in any suitable manner.

The heating composition 3 may be any suitable chemical or admixture capable of generating intense heat quickly to bring the rivet shank to a workable temperature. Preferably I employ "thermit", an admixture of small particles of aluminum and black magnetic iron oxid, for the purpose.

The igniting of the composition 3 may be effected in a number of ways. In the form shown in Fig. 2 a fuse 4 threading into the heating composition 3 is provided. This fuse may be lighted by a match or other flame, or if the fuse is a fine wire electrically contacting with the rivet blank as at 5, an electric current may be made to traverse it thereby heating the fuse to a suitable temperature to ignite the composition 3.

In Fig. 3 a percussion cap 6 is provided which requires but a light blow of a hammer or other pressure device to set it off and ignite the composition.

In Fig. 5 the composition is ignited by a gas torch 7 or other suitable flame such as might be generated by an electric arc.

In applying my rivet to secure parts together it is inserted cold through the alined holes in plates 8, 9, and the composition 3 ignited in any of the ways recited above or in any other convenient and suitable manner. A few minutes are allowed for the rivet shank to become sufficiently heated, this taking place quickly owing to the very high temperature of the composition 3 when ignited and the rivet is then headed in the usual way. Although the regular heading tools may be used with success, I find that a better job is obtained with a special die or set indicated at 10, Fig. 4, which die or set is adapted to throw the shank of the rivet outwardly. A cross-section through the finished rivet is shown in Fig. 6 in which it will be noted that the product of the chemical reaction of the ignited composition 3 is still contained in the pocket or cavity 2.

In cases where the heating effect of the ignited composition 3 is sufficient to raise the parts to a welding temperature, the heading operation will cause a welding of the sides of the rivet shank to the walls of the rivet holes in the plates 8 and 9 surrounding it.

It will be evident from Fig. 6 that on completing the operation, the cavity or pocket 2 in the rivet is still visible and in cases where this is objectionable I modify the riveting operation as indicated in Fig. 7. In this case I provide two rivets 11, 12 each having one head and similar to the rivets above described except that they (for the same thickness of work to be joined) are of approximately one-half the total length. These two short rivets are applied end to end in the rivet holes of the plates 8, 9 as shown in Fig. 7.

The rivet 12 is first inserted in the hole and ignited and the rivet 11 immediately inserted in the hole from the other side; the heat from the composition in the rivet 12 igniting the composition in the rivet 11. The hammer or pressure devices are immediately applied and as soon as the rivets become plastic they butt weld together. This modification of the invention produces work of excellent appearance which cannot be distinguished from the usual standard riveted work as now generally practised.

It will be understood that other ways of igniting the heating composition in the rivets 11 and 12 used in Fig. 7 other than that specifically described in connection with that modification may be resorted to.

What I claim as my invention is:—

1. A self-heating rivet consisting of a rivet blank having a pocket or cavity and an ignitible heating composition in said cavity.

2. A self-heating rivet consisting of a rivet blank having a pocket or cavity, an ignitible heating composition in said cavity and means adapted to ignite said composition.

3. A rivet blank consisting of a head and a shank provided with a longitudinal cavity containing an ignitible heating composition.

4. A self-heating rivet consisting of a rivet blank having a cavity, an ignitible heating composition in said cavity and means in said cavity and associated with said composition to ignite the same.

5. The method of riveting consisting in inserting a rivet blank containing an ignitible heating composition in the holes of the plates to be joined, igniting the heating composition and heading or upsetting said rivet.

6. The method of riveting consisting in inserting a rivet provided with an ignitible heating composition through the holes in the plates to be joined, igniting the heating composition and applying pressure to the rivet.

7. The method of riveting consisting in abutting the ends of two rivets provided with an ignitible heating composition within the work to be joined, igniting the heating composition of said rivets and applying pressure to weld the abutting ends of the rivets.

8. The method of riveting consisting in providing a rivet with an ignitible heating composition igniting said composition while the rivet is located in position in the work to heat the rivet and then completing the riveting operation by mechanical means.

Signed at New York in the county of New York and State of New York this 4th day of May A. D. 1920.

JAMES H. GRAVELL.

Witness:
IRENE LEFKOWITZ.